United States Patent
Jones

(10) Patent No.: US 6,299,929 B1
(45) Date of Patent: Oct. 9, 2001

(54) CONFECTIONERY PRODUCT MADE OF PROTEIN AND CARBOHYDRATE MATERIALS PRESENT IN A RELATIVE WEIGHT RATIO HIGHER THAN 1

(75) Inventor: Dennis Jones, Shelburne, VT (US)

(73) Assignee: Bariatrix Products International, Inc., Lachine (CA)

(*) Notice: Subject to any disclaimer, the term of this patent is extended or adjusted under 35 U.S.C. 154(b) by 0 days.

(21) Appl. No.: 09/639,851

(22) Filed: Aug. 16, 2000

Related U.S. Application Data

(63) Continuation of application No. 08/246,369, filed on May 19, 1994, now abandoned, which is a continuation of application No. 07/891,929, filed on Jun. 1, 1992, now abandoned, which is a continuation of application No. 07/641,131, filed on Jan. 15, 1991, now abandoned.

(51) Int. Cl.$^7$ ................... A23J 1/00; A23J 1/14; A23J 1/08; A23J 1/20; A23J 1/12; A23G 3/00
(52) U.S. Cl. ................. 426/656; 426/658; 426/660
(58) Field of Search ................... 426/656, 658, 426/660

(56) References Cited

U.S. PATENT DOCUMENTS

| | | | |
|---|---|---|---|
| 3,814,819 | * | 6/1974 | Morgan ........................... 426/810 |
| 4,152,462 | * | 5/1979 | Hayward et al. ................ 426/72 |
| 4,415,596 | * | 11/1983 | Anderson et al. .............. 426/103 |
| 4,832,971 | * | 5/1989 | Michnowski .................... 426/103 |
| 4,900,566 | * | 2/1990 | Howard ........................... 426/72 |

FOREIGN PATENT DOCUMENTS

| | | | |
|---|---|---|---|
| 0754215 | * | 12/1970 | (BE) ................................. 426/804 |
| 2853194 | * | 6/1980 | (DE) ................................. 426/656 |
| 2085273 | * | 4/1982 | (GB) ................................. 426/656 |

OTHER PUBLICATIONS

Smith et al., Soybeans: Chemistry and Technology, vol. 1 AVI Publishers Westport Conn, pp. 327–338 (1972).*

* cited by examiner

Primary Examiner—Anthony J. Weier
(74) Attorney, Agent, or Firm—Heller Ehrman White & McAuliffe

(57) ABSTRACT

A confectionery bar made up of a proteinaceous material and a carbohydrate material in a relative weight ratio higher than 1 and low in calorie content. The bar is made from (A) a proteinaceous material having a water absorption property of less than 2.5 grams of water per gram of protein at pH 5.5, and that is capable of emulsification with (B) a carbohydrate material that is digestible or indigestible. The bar is produced by cold extrusion. The proteinaceous material and the carbohydrate material are both present in a protein to carbohydrate ratio higher than 1. The proteinaceous material has a filler protein and a binding protein. The bar produced is very palatable, easy to masticate and has good organoleptic properties. It may be coated or not as desired.

7 Claims, No Drawings

CONFECTIONERY PRODUCT MADE OF PROTEIN AND CARBOHYDRATE MATERIALS PRESENT IN A RELATIVE WEIGHT RATIO HIGHER THAN 1

This is a continuation of application Ser. No. 08/246,369, filed May 19, 1994 now abandoned, which is a continuation of application Ser. No. 07/891,929 filed Jun. 1, 1992, now abandoned which is a continuation of application Ser. No. 07/641,131 filed Jan. 15, 1991, now abandoned.

BACKGROUND OF THE INVENTION (a) Field of the Invention

The present invention relates to a confectionery product having a protein to carbohydrate relative weight ratio higher than 1. In particular, the invention relates to a diet bar for use as part of a low calorie diet, especially a very low calorie diet.

(b) Description of the Prior Art

Very low calorie formula diet containing the minimum daily requirements of each of the minerals, proteins and digestible carbohydrates required by man have achieved remarkable commercial success. Such diets are usually formulated as a dry powder for use when mixed with water, either to produce a savory flavour drink resembling a soup, or a sweet flavour drink resembling a milk shake. The diets are designed for use as a sole source of nutrition over a lengthy period of time and their use can lead to significant weight losses.

However, since the diet is consumed in liquid form any desire on the part of the dieter to chew what is consumed as the daily diet is frustrated unless the dieter consumes something other than the formula diet itself. On the other hand, if the dieter does consume something other than the formula diet itself out of a desire to chew something, that can negate the effect of the diet and lead to a smaller than expected weight loss, with consequent disappointment, and/or to the breaking of the diet altogether.

While some meal replacement bars for use in conjunction with very low calorie formula diets have been proposed, such bars have to date proved to be relatively unsatisfactory and generally do not meet objectives of supplying protein without an excess of carbohydrate, due to the requirements of the manufacturing technology. High protein/low carbohydrate baked or compressed products are known. However, known bars made by a confectionery process have a poor taste and provide a substitute for one or more meals in a very low calorie dietary regimen which is much less palatable than the liquid formula diet itself.

In order to produce a confectionery meal replacement bar for use in conjunction with a very low calorie formula diet it is necessary to overcome a number of interrelated problems. Firstly, the bar must contain the necessary meal replacement level of protein in the overall diet. While that may vary depending on the form of presentation of the supplement, generally a bar should contain sufficient protein to provide at least about one-fifth and preferably at least about one-third of a day's supply of protein within the confines of the particular dietary regimen chosen. That will usually mean the bar must contain at least 5 grams of protein, and typically from about 10 to about 18 grams of protein, though larger amounts of protein are not necessarily excluded.

Secondly, the bar while having a sweet taste and not exceeding the low energy content requirements of the diet, may at the same time provide a proportion of the other nutrients, say from about one-fifth to about one-third of a day's supply of, for example, carbohydrate, fat, essential fatty acids, vitamins and minerals. This is not obligatory, and will depend on the type of dietary programme which is envisaged. Thus the bar may contain a sufficient proportion of minerals and vitamins to enable it to be used as a meal replacement without detracting from the mineral and/or vitamin levels supplied in the daily diet of which it is a part, in which case the marked taste of any such minerals and/or vitamins must be sufficiently masked.

Lastly, despite the previous requirements imposed, the bar must be palatable, and at the same time sufficiently low in calories so that it is compatible with a very low calorie dietary regime.

U.S. Pat. No. 4,900,566 discloses bars which partially overcome the current disadvantages of such dietary bars and can be made by conventional confectionery processes. These bars utilize for the carbohydrate component a mixture of a digestible and an indigestible carbohydrate in suitable forms, thus allowing the creation of a plastic mass that can be shaped or formed by extrusion or rolling and subsequent cutting into a bar shape or other appropriate form. This bar contains an amount of carbohydrate material which is at least equal in weight to the weight of proteinaceous material, and may be up to 10 times the weight of the proteinaceous material, whereby the desired reduction in calorie content is achieved by a greater or a lesser admixture of an indigestible, or poorly digestible non-fibrous carbohydrate; the use of a non-fibrous material in this context reduces the viscosity of the mixture and results in bars with improved organoleptic properties.

However, such a product is imposed with burdensome requirements because it must possess a minimum percentage of indigestible carbohydrate of molecular weight lower than 5000, in order to reduce the calorific content, and remain palatable.

It has now surprisingly been found that the use of certain specific proteinaceous material alone or in combination with others, provide an excellent material for producing a bar having a higher proportion of protein than carbohydrate, and that remains chewy and palatable. The use of such proteinaceous material having a dissociation between water absorption properties and other functional characteristics render them suitable for such high protein bars without any adverse effect on the palatability of the bar. Furthermore, this confectionery product containing a majority of proteins possesses very good organoleptic properties and satisfies the dieter between each meal.

The present invention also provides a bar with higher nutritional quality and at the same time lower calorific content.

Proteinaceous materials usually used for the production of previous confectionery bars having a protein:carbohydrate weight ratio lower than 1 possess associated functionality such as high water absorption and high emulsification properties. It has been surprisingly found that proteinaceous material having dissociated functionality such as low water absorption and medium to high emulsification properties are suitable for the production of a confectionery bar having a protein: carbohydrate relative weight ratio higher than 1.

OBJECTS OF THE INVENTION

It is one object of the present invention to provide a solid substitute for one or more meals in a very low calorie dietary regimen, which is at least as palatable as the various formula diet products or the conventional foods used, and which has a chewy texture.

Another object of the invention is to provide a palatable confectionery product which is sufficiently low in calories so that it is compatible with any very low calorie dietary regime.

It is a yet further object of the invention to provide a confectionery product as a bar containing a relatively high proportion of protein and having a good, chewy, yet open texture, with good organoleptic characteristics.

It is a yet further object of the invention to provide a confectionery bar which can be used as a vehicle for other special ingredients of a dietary, nutritional or pharmaceutical nature, without imposing an undue burden in terms of calorie content which might impede the use of the bar for such purposes.

In accordance with the foregoing objects, it has surprisingly been found that certain proteinaceous materials alone or in combination with mixtures of digestible and/or optionally indigestible, or poorly digestible carbohydrates, can be used for the manufacture of such a confectionery product in the form of a bar having a highly acceptable texture, and in which the amount of protein exceeds the total amount of carbohydrate.

Such products can provide the chewy texture required by the dieter, and are otherwise organoleptically acceptable, providing the necessary level of proteinaceous material without an excessive intake of carbohydrate. The formulations in accordance with the invention also surprisingly aid in masking the taste of any minerals and/or trace elements which are optionally present.

SUMMARY OF THE INVENTION

Accordingly, the present invention provides a smooth and chewy confectionery bar comprising:
proteinaceous material having low water absorption properties and medium to high emulsification properties;
carbohydrate material selected from the group consisting of: digestible carbohydrate, poorly digestible carbohydrate, indigestible carbohydrate, and mixtures thereof,
wherein the proteinaceous material and the carbohydrate material are present in a relative weight ratio of from about 1:0 to about 1:0.999.

Within the present invention, the term "smooth" is synonymous with the term "homogenous" with the proviso that neither term precludes the addition of solid particulate material.

Generally, the proteinaceous material used for the present invention comprise a mixture of "binding" proteins and "filler" proteins but some of them may also be used alone. The requirement for such a mixture is that whatever protein or blend of proteins is used, it should have low water absorption yet still be capable of binding the ingredients to give a plastic extrudable mass. In practice, this translates to a dissociation between water absorption and the other functional properties of the proteinaceous material or protein blend. The important factors are thus:

1) Low water absorption;
2) Emulsifying capacity better than would be expected from the low water absorption, thus medium to high;
3) Viscosity not as important, but low to medium preferred.

The "binding" protein may be selected from the group consisting of: soy protein isolates, whey protein, whole milk protein, pea protein, egg albumen, and wheat gluten.

Each binding protein used herein should possess the following dissociated functionality: Low water absorption, and medium to high emulsification properties.

The "filler" protein may be selected from the group consisting of: calcium caseinates, soy proteins, whey protein, pea protein, wheat gluten, and egg albumen.

Properties that the filler proteins should possess are: low functionality in general, with in particular low water absorption and low viscosity.

Although in general each of these proteins may be used alone for the production of such a confectionery bar (except for the whey proteins, pea proteins, wheat gluten, and egg albumen that, when used as fillers can not be used alone), it is preferred to use them in combination, particularly, the preferred ratios used ranges between 75:25 and 25:75 (filler to binder). The most preferred ratio is 54 parts of filler protein for 46 parts of binder.

The carbohydrate material comprised in such a bar may optionally comprise indigestible carbohydrate or poorly digestible carbohydrate having a molecular weight lower or equal to 18,000, such as, for example, polydextrose.

BRIEF DESCRIPTION OF PREFERRED EMBODIMENTS

For confectionery purposes, and as desired or convenient, manufacturers often produce and package bars in packs of two or more bars. Thus, the product is hereby defined as "a confectionery bar" whether or not one serving may consist of more than one bar.

The invention relates to confectionery bars, which may or may not be enrobed with chocolate, yoghurt, peanut, carob or other type of coating material, in which the amount of proteinaceous material exceeds the amount of carbohydrate material. The carbohydrate material may consist of digestible carbohydrates alone, or mixtures of digestible carbohydrates with poorly digestible (or non-digestible) carbohydrates, or of poorly digestible carbohydrates alone. The carbohydrate material may be added as a solid, dry material, but is generally used as a concentrated solution.

The proteinaceous materials used for the invention may be binding proteins, filler proteins, or mixtures thereof.

The binding proteins may be any protein which has low absorption properties yet will emulsify and can create a matrix on hydration. Specific examples are:

| | |
|---|---|
| Soy proteins: | PP-710* |
| | PP-670* |
| | PP-860* (no longer available commercially) |
| | ARDEX-R* |
| | ARDEX D-HD* |
| Whey proteins: | Functional |
| Whole milk protein: | Functional, e.g. REFIT (DMV)* |
| Pea protein: | WOODSTONE GOLD* |
| Egg albumen: | Partially denatured |
| Wheat gluten: | Partially devitalized |

Generally, the preferred properties of the binding proteins, from which a person skilled in the art should be able to identify other soy proteins that could be used are:

1) low water absorption, preferably less than 2.5 grams of water per gram protein at pH 5.5;
2) medium to high emulsification properties;
3) low to medium viscosity.

The filler proteins used for the invention may be any protein which has been denatured by processing to a low level of functional activity. Specific examples are:

| Caseinates: | FARBEST 290* |
| --- | --- |
|  | FARBEST 270* |
|  | FARBEST 200* |
|  | FARBEST 312* |
| Soy proteins: | PP-860* |
|  | ARDEX-R* |
| Whey proteins: | Denatured |
| Pea proteins: | WOODSTONE GOLD* |
| Wheat gluten: | Devitalized |
| Egg albumen: | Denatured |

*Trade-marks

In addition to the above fillers, caseinate having been heat treated before drum drying may also be used.

The preferred properties of the fillers, from which a person skilled in the art should be able to identify other fillers that could be used are:

1) low functionality in general, with in particular low water absorption and low viscosity.

Although not disclosed here, other proteins may be later found to possess the relevant properties and be suitable for the production of the present invention.

Effectively, any of the binding can be used with any of the filler proteins, but the optimal ratio will change for each combination, with the limiting values of 100% of binding protein on the one hand and, 100% filler protein on the other hand (for the caseinates and soy proteins as filler proteins only).

Thus, it is the properties of the mixture of proteinaceous material that are important. The ultimate choice depends on many factors including price, flavour and availability. For example, Alanate 312* is superior to Farbest 290* but has an obvious flavour which some people do not like. The same applies to pea protein. As far as price is concerned, egg albumen and whey protein are 4 to 5 times as expensive as soy, and would only be used if price was not a consideration. Wheat gluten is cheap, but has low nutritional value.

The best results for our purposes were obtained with PP-710* and Farbest 290* in the ratio 54:46. However, the ratio can vary as widely as from 65:35 to 40:60.

The carbohydrate material used for the invention may be a sugar polymer such as, for example, polydextrose in a 70% solution although sorbitol and xylitol may also be used in a 70% solution. This polymer is only partially metabolised in the human body. Most of the product passes through the body unabsorbed, and the principal utilisation pathway for the remainder involves metabolism by intestinal micro-organisms to form carbon dioxide and volatile fatty acids. Those acids can then be absorbed and utilised as an energy source so that in man the energy provided by polydextrose is 1 Kcal per gram. However, digestible carbohydrates may be used in the production of the present invention such as, for example, honey, glucose-fructose syrup, sucrose, cocoa butter, high-fructose corn syrup, peanut butter, nuts, and mixtures thereof.

The optional coating may be a conventional coating product freely available in the trade, or may be a custom-manufactured product containing greater amounts of protein than is usual (that is, 15% or more of the weight of the coating may consist of protein).

The present invention is produced by conventional confectionery processes as defined in the several examples following:

EXAMPLE 1

A liquid blend is prepared containing polydextrose (70% solids), honey, glucose-fructose syrup (77% solids), liquid lecithin, soya bean oil and vanilla flavour. This is maintained at 40 C.–45 C.

| INGREDIENT: | PER 1000 KG: | NUTRITIONAL PROFILE | per G: |
| --- | --- | --- | --- |
| Polydextrose 70% | 453.2 kg | Protein: | 0.000 |
| Honey | 216.7 kg | * Fat: | 0.154 |
| Glucose-fructose | 164.5 kg | Carbohydrate: | 0.307 |
| Soya bean oil | 87.7 kg | Polydextrose: | 0.317 |
| Lecithin, liquid | 66.0 kg | Kilocalories: | 2.860 |
| Vanilla flavour | 1.08 kg | | |
| Citric acid | 1.00 kg | | |

* Lecithin calculated at 8.0 kilocalories per gram.

A hard chocolate coating was then prepared by blending calcium caseinate into a proprietary dark chocolate coating, #453, manufactured by NEILSON*. A small amount of hydrogenated vegetable oil was also incorporated into the blend, to keep viscosity at an acceptable level. The formulation was prepared according to the prescription below:

| INGREDIENT: | PER 1000 KG: | NUTRITIONAL PROFILE | per G: |
| --- | --- | --- | --- |
| Dark coating 453 | 700.00 kg | Protein: | 0.210 |
| ALANATE 312 | 200.00 kg | (*)Fat: | 0.368 |
| Coating fat | 90.00 kg | Carbohydrate: | 0.389 |
| Lecithin, liquid | 10.00 kg | Kilocalories: | 5.539 |

(*)Lecithin calculated at 8.0 kilocalories per gram.

The main mix for each bar formulation ["CORE" mix] was prepared to specifications indicated below. The ingredients were thoroughly mixed in a single-shaft ribbon blender (10 minutes), after which half the liquid mix was blended in, followed by the flavours, and the whole mixed for a further 5 minutes. The remaining amount of warm liquid mix was then added, followed by the water, and the entire mixture further blended to a homogenous plastic mass. It was then extruded through a WERNERLEHARA* 16" low-temperature former, and the resultant ribbon was cut into oblong bars of weights specified. Coating (as specified) was then applied to each bar at about 45 C. Coated bars were cooled, individually sealed into MYLAR* wrappers, and packed in boxes.

| HONEY-PEANUT BAR: | | |
| --- | --- | --- |
| Ingredient: | Weight per mix in kg: | Weight per mix in lbs: |
| Soy Protein PP 710* | 95.45 | 210.00 |
| FARBEST 290* | 79.54 | 175.00 |
| Peanut flour(*) | 11.82 | 26.00 |
| Peanut flavour | 1.36 | 3.00 |
| Buttery caramel | 2.72 | 6.00 |
| Liquid mix | 186.82 | 411.00 |

-continued

HONEY-PEANUT BAR:

| Ingredient: | Weight per mix in kg: | Weight per mix in lbs: |
|---|---|---|
| Water | 10.45 | 23.00 |
| TOTAL BATCH WEIGHT: | +/−387.16 | +/−854.00 |
| Coating | +/−68.00 | +/−150.00 |

(*)Partially defatted; toasted.
CORE WEIGHT: 32.5 g, range 32.0–33.5 g
FINISHED BAR: 38.3 g +/−3%

Finished bars contained 15 grams protein and 12.7 grams carbohydrate, of which 7.5 grams was fully available and 4.7 grams was the poorly digestible polydextrose.

EXAMPLE 2

An uncoated bar was prepared following the mixing and extrusion procedures given in Example 1, except that the bar was not enrobed with a coating. Bars were extruded at a weight of 37.5 grams, giving bars containing 15 grams of protein and 11.4 grams of carbohydrate, of which 5.7 grams was fully available and 5.7 grams was the poorly digestible polydextrose.

EXAMPLE 3

The bar of Example 2 was coated with 6 grams of an enrobing mixture prepared from 55 grams powdered sugar ("Icing Sugar"), 20 grams calcium caseinate (Farbest 200*) and 25 grams water, giving a bar of 43.5 grams weight with 16.1 grams protein and 14.7 grams carbohydrate, of which 5.7 grams was the poorly digestible polydextrose.

EXAMPLE 4

A coated bar was prepared following the mixing and extrusion procedures given in Example 1, except that the core of the bar was prepared to the following formulation:

CHOCOLATE-ORANGE BAR

| Ingredient: | Weight per mix in kg: | Weight per mix in lbs: |
|---|---|---|
| Soy Protein PP 710* | 95.45 | 210.00 |
| FARBEST 290* | 79.54 | 175.00 |
| Cocoa powder | 11.82 | 26.00 |
| Chocolate flavour | 2.27 | 5.00 |
| Orange oil | 0.68 | 1.50 |
| Solution | 186.82 | 411.00 |
| Water (up to) | 10.45 | 23.00 |
| TOTAL BATCH WEIGHT: | +/−387.03 | +/−851.50 |
| Coating | +/−68.22 | +/−150.00 |

CORE WEIGHT: 33.0 g, range 32.0–34.0 g
FINISHED BAR: 38.9 g +/−3%

Finished bars contained 15 grams protein and 12.7 grams carbohydrate, of which 7.5 grams was fully available and 4.7 grams was the poorly digestible polydextrose.

EXAMPLE 5

An uncoated bar was prepared following the mixing and extrusion procedures given in Example 1 but using the formulation given in Example 4. Bars were extruded at a weight of 38 grams, giving bars containing 15 grams of protein and 11.4 grams of carbohydrate, of which 5.7 grams was fully available and 5.7 grams was the poorly digestible polydextrose.

EXAMPLE 6

The bar of Example 5 was coated with 7 grams of an enrobing mixture prepared from 55 grams powdered sugar ("Icing Sugar"), 20 grams calcium caseinate (Farbest 200*) and 25 grams water, giving a bar of 44 grams weight with 16.3 grams protein and 15.2 grams carbohydrate, of which 5.7 grams was the poorly digestible polydextrose.

EXAMPLE 7

The formulation of Example 1 was mixed in a double-shaft ribbon blender and extruded through a WERNER-LEHARA* 32" extruder equipped with a wire cut attachment. Large dies of cross-section 1½"×2½" were used, and slices corresponding to a weight of 32.5 grams were cut off parallel to the die face. These slices were then enrobed in a dark high protein chocolate compound coating made from sucrose, hydrogenated vegetable oil, calcium caseinate, cocoa powder, lecithin, flavour, emulsifiers and stabilizers, containing 21% protein, 36% fat and 40% carbohydrate.

Finished bars were nutritionally identical with those of Example 1, containing 15 grams protein and 12.7 grams carbohydrate, of which 7.5 grams was fully available and 4.7 grams was the poorly digestible polydextrose.

EXAMPLE 8

A formulation identical to that of Example 4 was mixed in the fashion described in Example 7, extruded in a 32" WERNER-LEHARA* extruder with wire-cut attachment, and enrobed with the coating described in Example 7.

Finished bars were nutritionally identical with those of Example 4, containing 15 grams protein and 12.7 grams carbohydrate, of which 7.5 grams was fully available and 4.7 grams was the poorly digestible polydextrose.

EXAMPLE 9

A blend of 54 parts by weight soy protein isolate (PP-710*, Protein Technologies International) and 46 parts by weight calcium caseinate (FARBEST 290*, Farbest Brands Inc.) was prepared in a ribbon blender and labelled Protein Blend "A".

Dry ingredients corresponding to the mix prescriptions given below were placed in the bowl of an ARTOFLEX* dough mixer and mixed gently until completely homogenous (5 minutes). Aqueous liquids (high fructose corn syrup, honey, polydextrose etcetera) were then added, mixed in (2 minutes) and followed by the oil and lecithin. After further gentle mixing, flavours were added, the whole mixed for a further 2 or 3 minutes, and the resultant mix tested for consistency. When satisfactory, it was extruded through a WERNER-LEHARA* 16" continuous roll extruder equipped with a 1.25"×0.5" die, 8 across. The resultant ribbons were cut with a pneumatic knife to an appropriate length for the indicated weight, and subsequently enrobed in a high protein coating of the composition indicated in Example 7.

HONEY-PEANUT BAR

| Ingredient: | Weight per mix: | |
|---|---|---|
| | kgs | lbs |
| Protein Blend "A" | 29.54 | 65.13 |
| Polydextrose 70% | 15.61 | 34.42 |
| Honey | 7.65 | 16.87 |
| High fructose syrup | 6.89 | 15.19 |
| Soya oil | 2.11 | 4.65 |
| Lecithin | 2.11 | 4.65 |
| Peanut butter | 2.04 | 4.50 |
| Water up to | 1.36 | 3.00 |
| Flavours | 1.15 | 2.54 |
| Glycerol | 0.45 | 1.00 |
| Potassium sorbate | 0.07 | 0.15 |
| Citric acid | 0.03 | 0.07 |
| TOTAL BATCH WEIGHT: | +/−69.01 | +/−152.14 |
| Coating (Example 7) | +/−12.18 | +/−26.85 |

CORE WEIGHT: 35.0 g, range 34.5–35.5 g
FINISHED BAR: 41.0 g +/−3%

The nutritional analysis of the bars was calculated by the Atwater method, based on the reconciliation below:

| Constituent: | Weight: | Factor: | Kilocalories: |
|---|---|---|---|
| Protein, casein: | 7.46 | @4.27 | 31.85 |
| Protein, soy: | 7.13 | @3.47 | 24.74 |
| Protein, peanut: | 0.28 | @3.47 | 0.97 |
| Protein, cocoa: | 0.13 | @1.83 | 0.24 |
| Fat, PKO: | 2.10 | @8.84 | 18.56 |
| Lecithin: | 1.13 | @7.00 | 7.91 |
| Soya oil: | 1.07 | @8.84 | 9.46 |
| Peanut oil: | 0.50 | @8.37 | 4.19 |
| Fat, cocoa: | 0.06 | @8.37 | 0.50 |
| Fructose: | 2.96 | @3.68 | 10.89 |
| Glucose: | 2.43 | @3.68 | 8.94 |
| Sucrose/others: | 2.40 | @3.87 | 9.29 |
| CHO, peanut: | 0.09 | @4.07 | 0.37 |
| CHO, cocoa: | 0.07 | @1.33 | 0.09 |
| Polydextrose: | 5.80 | @1.00 | 5.80 (+ fibre) |
| | | | 133.80 |

The weights of protein and carbohydrate were calculated:

| | | | |
|---|---|---|---|
| Protein, casein: | 7.46 | Fructose: | 2.96 |
| Protein, soy: | 7.13 | Glucose: | 2.43 |
| Protein, peanut: | 0.28 | Sucrose/others: | 2.40 |
| Protein, cocoa: | 0.13 | CHO, peanut: | 0.09 |
| | | CHO, cocoa: | 0.07 |
| | | Polydextrose: | 5.55 |
| | 15.00 | | 13.50 |

The bars thus contained 15.00 grams of protein and 13.50 grams total carbohydrate, of which 5.55 grams was the poorly digestible carbohydrate, polydextrose.

The overall nutritional profile of the bars was:

| HONEY-PEANUT BAR Ingredient: | Weight per Bar (g): | Protein | Fat | CHO | Fibre |
|---|---|---|---|---|---|
| | | | per bar | | |
| Calcium caseinate | 8.285 | 7.46 | — | — | — |
| Soy Protein Isolate | 8.098 | 7.13 | — | — | — |
| Polydextrose, 70% | 7.925 | — | — | — | 5.55 |
| Honey | 3.884 | — | — | 3.09 | |
| Glucose-fructose 77% | 3.498 | — | — | 2.69 | |
| Hydrogenated PKO | 2.098 | — | 2.10 | — | — |
| Sucrose | 2.014 | — | — | 2.01 | — |
| Lecithin | 1.133 | — | 1.07 | — | — |
| Soya oil | 1.01 | — | 1.07 | — | — |
| Peanut butter | 1.036 | 0.28 | 0.50 | 0.09 | 0.07 |
| Water | 0.690 | — | — | — | — |
| Cocoa powder | 0.555 | 0.13 | 0.06 | 0.07 | 0.18 |
| Flavours | 0.615 | — | — | — | — |
| Glycerol | 0.228 | — | — | — | |
| Potassium sorbate ** | 0.041 | — | — | — | — |
| Citric acid | 0.015 | — | — | — | — |
| Mono/diglycerides | 0.012 | — | 0.01 | — | — |
| Sorbitan monost'e | 0.006 | — | — | — | — |
| Polysorbate 60 | 0.006 | — | — | — | — |
| Nutritional analysis | 41.210 | 15.00 | 4.81 | 7.95 | 5.80 |
| PER 100 GRAMS: | | 36.40 | 11.67 | 19.29 | 14.07 |

EXAMPLE 10

The procedures of Example 9 were followed except that the formulation mixed, extruded and enrobed with a white high protein yoghurt coating made from sucrose, hydrogenated vegetable oil, calcium caseinate, whey and yoghurt powders, lecithin and flavour, containing 21% protein, 36% fat and 40% carbohydrate.

| Constituent: | Weight: | Factor: | Kcal: |
|---|---|---|---|
| Protein, casein: | 7.46 | @4.27 | 31.85 |
| Protein, soy: | 7.13 | @3.47 | 24.74 |
| Protein, cocoa: | 0.29 | @1.83 | 0.53 |
| Fat, PKO: | 2.10 | @8.84 | 18.56 |
| Lecithin: | 1.13 | @7.00 | 7.91 |
| Soya oil: | 1.07 | @8.84 | 9.46 |
| Fat, cocoa: | 0.26 | @8.37 | 2.18 |
| Fat, butter: | 0.22 | @8.79 | 1.93 |
| Fructose: | 2.99 | @3.68 | 11.00 |
| Sucrose/other | 2.40 | @3.87 | 9.29 |
| Glucose: | 2.45 | @3.68 | 9.02 |
| CHO, cocoa: | 0.16 | @1.33 | 0.21 |
| Polydextrose: | 6.00 | @1.00 | 6.00 (+ fibre) |
| | | | 132.68 |

The weights of protein and carbohydrate were calculated:

| | | | |
|---|---|---|---|
| Protein, casein: | 7.46 | Fructose: | 2.99 |
| Protein, soy: | 7.13 | Sucrose/others: | 2.40 |
| Protein, cocoa: | 0.29 | Glucose: | 2.45 |
| | | CHO, cocoa: | 0.16 |
| | | Polydextrose: | 5.55 |
| | 14.88 | | 13.55 |

The bars thus contained 14.88 grams of protein and 13.55 grams total carbohydrate, of which 5.55 grams was the poorly digestible carbohydrate, polydextrose.

The overall nutritional profile of the bars was:

| CHOCOLATE-ORANGE BAR Ingredient: | Weight per Bar (g): | Protein | Fat | CHO | Fibre |
|---|---|---|---|---|---|
| | | | per bar | | |
| Calcium caseinate | 8.285 | 7.46 | — | — | — |
| Soy Protein Isolate | 8.098 | 7.13 | — | — | — |
| Polydextrose 70% | 7.925 | — | — | — | 5.55 |
| Honey | 3.884 | — | — | 3.09 | — |
| Glucose-fructose 77% | 3.569 | — | — | 2.74 | — |
| Hydrogenated PKO | 2.098 | — | 2.10 | — | — |
| Sucrose | 2.014 | — | — | 2.01 | — |
| Cocoa powder | 1.380 | 0.29 | 0.26 | 0.16 | 0.45 |
| Lecithin | 1.133 | — | 1.07 | — | — |
| Soya oil | 1.071 | — | 1.07 | — | — |
| Water | 0.690 | — | — | — | — |
| Flavours | 0.575 | — | — | — | — |
| Butter | 0.268 | — | 0.22 | — | — |
| Glycerol | 0.228 | — | — | — | — |
| Potassium sorbate | 0.041 | — | — | — | — |
| Citric acid | 0.015 | — | — | — | — |
| Mono/diglycerides | 0.012 | — | 0.01 | — | — |
| Sorbitan monost'e | 0.006 | — | — | — | — |
| Polysorbate 60 | 0.006 | — | — | — | — |
| Nutritional analysis | 41.298 | 14.88 | 4.73 | 8.00 | 6.00 |
| R 100 GRAMS: | | 36.03 | 11.45 | 19.37 | 14.53 |

EXAMPLE 11

The procedures of Example 9 were followed except that the formulation mixed, extruded and enrobed had the composition shown below, and a white, yoghurt-based coating was used for the enrobing of the bars.

| HONEY-ALMOND BAR | | |
|---|---|---|
| | Weight per mix: | |
| Ingredient: | kgs | lbs |
| Protein Blend "A" | 30.75 | 67.80 |
| Honey | 16.07 | 35.43 |
| Polydextrose 70% | 15.50 | 34.17 |
| Almond butter | 3.09 | 6.82 |
| Lecithin | 2.20 | 4.84 |
| Water up to | 1.25 | 2.75 |
| Glycerol | 0.45 | 1.00 |
| High fructose syrup | 0.45 | 1.00 |
| Flavours | 0.95 | 2.09 |
| Potassium sorbate | 0.07 | 0.15 |
| Citric acid | 0.03 | 0.07 |
| TOTAL BATCH WEIGHT: | +/−70.81 | +/−156.12 |
| Coating (see below) | +/−12.50 | +/−27.56 |

CORE WEIGHT: 35.0 g, range 34.5–35.5 g
FINISHED BAR: 41.0 g +/−3%

The bar was coated with a white high protein yoghurt coating made from sucrose, hydrogenated vegetable oil, calcium caseinate, whey and yoghurt powders, lecithin and flavour, containing 21% protein, 36% fat and 40% carbohydrate.

The Caloric value of the bar was calculated using the Atwater method.

| CALORIC VALUE, HONEY-ALMOND BAR (using Atwater factors) | | | |
|---|---|---|---|
| Constituent: | Weight: | Factor: | Kcal: |
| Protein, casein: | 7.47 | @4.27 | 31.90 |
| Protein, soy: | 7.23 | @3.47 | 25.09 |
| Protein, almond: | 0.27 | @3.47 | 0.94 |
| Protein, whey: | 0.07 | @4.27 | 0.30 |
| Protein, yoghurt: | 0.05 | @4.27 | 0.21 |
| Total Calories from Protein: | | | 58.44 |
| Fat, PKO: | 2.10 | @8.84 | 18.56 |
| Lecithin: | 1.18 | @7.00 | 8.26 |
| Almond oil: | 0.82 | @8.37 | 6.86 |
| Sucrose/others: | 3.36 | @3.87 | 13.00 |
| Fructose: | 3.13 | @3.68 | 11.52 |
| Glucose: | 2.57 | @3.68 | 9.46 |
| CHO, whey: | 0.40 | @3.87 | 1.55 |
| CHO, almond: | 0.14 | @4.07 | 0.57 |
| CHO, yoghurt: | 0.06 | @3.87 | 0.23 |
| Polydextrose: | 5.52 | @1.00 | 5.52 (+fibre) |
| | | | 133.97 |

The weights of protein and carbohydrate were calculated:

| | | | |
|---|---|---|---|
| Protein, casein: | 7.47 | Sucrose/others: | 2.90 |
| Protein, soy: | 7.23 | Fructose: | 3.13 |
| Protein, almond: | 0.27 | Glucose: | 2.57 |
| Protein, whey: | 0.07 | CHO, whey: | 0.40 |
| Protein, yoghurt: | 0.05 | CHO, almond: | 0.14 |
| | 15.09 | CHO, yoghurt: | 0.06 |
| | | Polydextrose: | 5.37 |
| | | | 15.03 |

The bars thus contained 15.09 grams of protein and 15.03 grams total carbohydrate, of which 3.37 grams was the poorly digestible carbohydrate, polydextrose.

The overall nutritional profile of the bars is shown in the table which follows.

HONEY-ALMOND flavoured protein bar of 41 g:

| HONEY-ALMOND BAR | | | | | |
|---|---|---|---|---|---|
| Ingredient: | Weight per Bar (g): | Protein | Fat | CHO | Fibre |
| | | | per bar | | |
| Calcium caseinate | 8.298 | 7.47 | — | — | — |
| Soy protein isolate | 8.216 | 7.23 | — | — | — |
| Honey | 7.951 | — | — | 6.33 | — |
| Polydextrose 70% | 7.669 | — | — | — | 5.37 |
| Hydrogenated PKO | 2.098 | — | 2.10 | — | — |
| Sucrose | 2.098 | — | — | 2.10 | — |
| Almond butter ** | 1.528 | 0.27 | 0.82 | 0.14 | 0.15 |
| Lecithin | 1.181 | — | 1.09 | — | — |
| Water | 0.618 | — | — | — | — |
| Whey powder | 0.555 | 0.07 | — | 0.40 | — |
| Glucose-fructose 77% | 0.223 | — | — | 0.17 | — |
| Glycerol | 0.223 | — | — | — | — |
| Yoghurt solids | 0.123 | 0.05 | — | 0.06 | — |
| Potassium sorbate ** | 0.041 | — | — | — | — |
| Sodium chloride | 0.037 | — | — | — | — |
| Colour | 0.025 | — | — | — | — |
| Citric acid | 0.015 | — | — | — | — |
| Nutritional analysis | 41.399 | 15.09 | 4.01 | 9.20 | 5.52 |
| PER 100 GRAMS: | | 36.45 | 9.69 | 22.22 | 13.33 |

EXAMPLE 12

A low calorie bar of Honey-Peanut flavour was made to the formulation shown below, following the procedures described in Example 9.

Honey Peanut BAR

| Ingredients: | Weight per mix: kgs | lbs |
|---|---|---|
| Protein Blend "A" | 29.54 | 65.13 |
| Polydextrose 70% | 29.30 | 64.61 |
| Lecithin | 2.50 | 4.65 |
| Peanut pieces | 2.04 | 4.50 |
| Water up to | 1.36 | 3.00 |
| Flavours | 1.15 | 2.54 |
| Honey | 1.02 | 2.25 |
| Peanut butter | 1.02 | 2.25 |
| Glycerol | 0.45 | 1.00 |
| Aspartame | 0.08 | 0.17 |
| Citric acid | 0.03 | 0.07 |
| TOTAL BATCH WEIGHT: | +/−68.11 | +/−150.17 |
| Coating (Example 7) | +/−12.02 | +/−26.50 |

CORE WEIGHT: 35.0 g, range 34.5–35.5 g
FINISHED BAR: 41.0 g +/−3%

The bars contained 15.00 grams of protein and 13.50 grams total carbohydrate, of which 10.39 grams was the poorly digestible carbohydrate, polydextrose. Energy content was calculated at 105 kilocalories per bar.

EXAMPLE 13

A low calorie bar of Honey-Peanut flavour was made to the formulation shown below, following the procedures described in Example 9.

Honey Peanut BAR

| Ingredient: | Weight in kg: | Experimental batch: g/85 g | g/bar: |
|---|---|---|---|
| Protein Blend "A" | 22.00 | 31.82 | 13.57 |
| Polydextrose, 70% | 28.00 | 40.50 | 17.27 |
| Cellulose | 2.20 | 3.18 | 1.36 |
| Peanut butter | 2.30 | 3.33 | 1.42 |
| Lecithin | 1.90 | 2.75 | 1.17 |
| Honey | 0.80 | 1.16 | 0.49 |
| Flavours | 1.08 | 1.56 | 0.67 |
| Glycerine | 0.34 | 0.49 | 0.21 |
| Aspartame | 0.06 | 0.09 | 0.04 |
| Potassium sorbate | 0.06 | 0.09 | 0.04 |
| Citric acid | 0.02 | 0.03 | 0.01 |
| TOTAL BATCH WEIGHT: | 58.76 | | |
| Coating (Example 7) | 10.36 | | |

CORE WEIGHT: 36.25 grams.
FINISHED BAR: 42.64 grams.

The weights of protein and carbohydrate were calculated per 100 grams of bar:

| Protein, casein: | 13.173 | Fructose: | 0.414 |
|---|---|---|---|
| Protein, casein: | 3.032 | Sucrose/others: | 0.549 |
| Protein, soy: | 15.464 | CHO, peanut: | 0.286 |

-continued

| Protein, peanut: | 0.866 | CHO, cocoa: | 0.145 |
|---|---|---|---|
| Protein, cocoa: | 0.299 | Glycerine: | 0.490 |
| | 32.834 | Polydextrose: | 28.350 |
| | | | 30.234 |

Per 100 grams, the bars thus contained 32.83 grams of protein and 30.23 grams total carbohydrate, of which 28.35 grams was the poorly digestible carbohydrate, polydextrose. Size of bar for 14 grams protein: 42.64 grams coated. Calorie count of a 14 gram bar: 99.45 kilocalories.

CALORIC VALUE, HONEY-PEANUT BAR
(per 100 g, using Atwater factors)

| Constituent: | Weight: | Factor: | Kilocalories: |
|---|---|---|---|
| Protein, casein: | 13.173 | @4.27 | 56.249 |
| Protein, casein: | 3.032 | @4.27 | 12.947 coating |
| Protein, soy: | 15.464 | @3.47 | 53.660 |
| Protein, peanut: | 0.866 | @3.47 | 3.005 |
| Protein, cocoa: | 0.299 | @1.83 | 0.547 |
| 32.834 (grams protein) | | | |
| Total Calories from Protein: | | | 126.408 |
| Fat, PKO: | 5.100 | @8.84 | 45.084 |
| Lecithin:. | 2.900 | @7.00 | 20.300 |
| Peanut oil: | 0.602 | @8.37 | 5.039 |
| Fat, cocoa: | 0.145 | @8.37 | 1.214 |
| Fructose: | 0.414 | @3.68 | 1.524 |
| Sucrose/others: | 0.549 | @3.87 | 2.125 |
| CHO, peanut: | 0.286 | @4.07 | 1.164 |
| CHO, cocoa: | 0.145 | @1.33 | 0.193 |
| Glycerine: | 0.409 | @3.75 | 1.838 |
| Polydextrose: | 28.350 | @1.00 | 28.350 (+fibre) |
| Total Calories per 100 grams | | | 233.239 |

EXAMPLE 14

A bar of Black Forest Cake flavour was made to the formulation shown below, following the procedures described in Example 9. The bar was enrobed in the coating of Example 7.

| BLACK FOREST BAR Ingredient: | Weight in kg: |
|---|---|
| Protein Blend "A" | 29.54 |
| Polydextrose 70% | 15.62 |
| Fructose syrup 77% | 7.34 |
| Sorbitol 70% | 7.34 |
| Soya oil | 2.12 |
| Lecithin | 2.12 |
| Cocoa powder | 1.60 |
| Cherries, dried | 1.60 |
| Milk, full fat | 1.00 |
| Flavour | 1.11 |
| Cream, whipping | 0.88 |
| Glycerol | 0.46 |
| Potassium sorbate | 0.08 |
| Citric acid | 0.04 |

CORE WEIGHT: 28.0 g, range 27.5–28.5 g
FINISHED BAR: 34.0 g +/− 3%

The weights of protein and carbohydrate were calculated for a bar:

| | | | |
|---|---|---|---|
| Protein, casein: | 6.09 | Fructose: | 2.52 |
| Protein, soy: | 5.69 | Sorbitol/glycerol | 2.24 |
| Protein, cocoa: | 0.20 | Sucrose/others: | 1.84 |
| Protein, cherry: | 0.02 | CHO, cocoa: | 0.56 |
| Protein, milk: | 0.02 | Glucose: | 0.24 |
| | | CHO, milk: | 0.03 |
| | | Polydextrose: | 4.40 |
| | 12.02 | | 11.83 |

The bars thus contained 12.02 grams of protein and 11.83 grams total carbohydrate, of which 4.40 grams was the poorly digestible carbohydrate, polydextrose.

The overall nutritional profile of the bars was thus:

| Constituent: | Weight: | Factor: | Kcal: |
|---|---|---|---|
| Protein, casein: | 6.09 | @4.27 | 26.00 |
| Protein, soy: | 5.69 | @3.47 | 19.74 |
| Protein, cocoa: | 0.20 | @1.83 | 0.37 |
| Protein, cherry: | 0.02 | @3.35 | 0.07 |
| Protein, milk: | 0.02 | @4.27 | 0.09 |
| Fat, PKO: | 1.92 | @8.84 | 16.97 |
| Lecithin: | 0.90 | @7.00 | 6.30 |
| Soya oil: | 0.85 | @8.84 | 7.51 |
| Fat, cocoa: | 0.21 | @8.37 | 1.76 |
| Fat, milk: | 0.10 | @8.79 | 0.88 |
| Cherry oil: | 0.01 | @8.37 | 0.08 |
| Fructose: | 2.52 | @3.60 | 9.07 |
| Sorbitol: | 2.24 | @3.60 | 8.06 (+ glycerol) |
| Sucrose/others: | 1.84 | @3.87 | 7.12 |
| CHO, cocoa: | 0.56 | @1.33 | 0.74 |
| Glucose: | 0.24 | @3.68 | 0.88 |
| CHO, milk: | 0.03 | @3.87 | 0.12 |
| Polydextrose: | 4.52 | @1.00 | 4.52 (+ fibre) |
| | | | 110.28 |

| BLACK FOREST BAR Ingredient: | Weight per Bar (g): | Protein | Fat | CHO | Fibre |
|---|---|---|---|---|---|
| | | | | per bar | |
| Calcium caseinate | 6.695 | 6.09 | — | — | — |
| Soy Protein Isolate | 6.410 | 5.69 | — | — | — |
| Polydextrose, 70% | 6.280 | — | — | — | 4.40 |
| Fructose syrup 77% | 2.950 | — | — | 2.27 | — |
| Sorbitol 70% | 2.950 | — | — | 2.06 | — |
| Hydrogenated PKO | 1.923 | — | 1.92 | — | — |
| Sucrose | 1.846 | — | — | 1.84 | — |
| Cocoa powder | 1.135 | 0.20 | 0.21 | 0.56 | 0.06 |
| Lecithin | 0.905 | — | 0.90 | — | — |
| Soya oil | 0.850 | — | 0.85 | — | — |
| Cherries | 0.640 | 0.02 | 0.01 | 0.49 | 0.06 |
| Flavours | 0.467 | — | — | — | — |
| Milk | 0.400 | 0.01 | 0.01 | 0.02 | — |
| Cream | 0.290 | 0.01 | 0.09 | 0.01 | — |
| Glycerol | 0.180 | — | — | 0.18 | — |
| Additives | 0.101 | — | — | — | — |
| Nutritional analysis | 34.022 | 12.02 | 4.00 | 7.43 | 4.5 |

EXAMPLE 15

A bar of Chocolate-Walnut flavour was made to the formulation shown below, following the procedures described in Example 9. The bar was enrobed in the coating of Example 7.

| CHOCOLATE-WALNUT BAR Ingredient: | Weight in kg: |
|---|---|
| Protein Blend "A" | 29.54 |
| Polydextrose 70% | 15.62 |
| High fructose syrup | 14.68 |
| Soya oil | 2.12 |
| Lecithin | 2.12 |
| Cocoa powder | 1.60 |
| Ground walnuts | 1.60 |
| Milk, full fat | 1.00 |
| Flavours | 0.99 |
| Cream, whipping | 0.88 |
| Glycerol | 0.46 |
| Potassium sorbate | 0.08 |
| Citric acid | 0.04 |

CORE WEIGHT: 35.0 g, range 34.5–35.5 g
FINISHED BAR: 41.0 g +/− 3%

The bars contained 14.24 grams of protein and 13.76 grams total carbohydrate, of which 5.38 grams was the poorly digestible carbohydrate, polydextrose. Energy content was calculated at 135 kilocalories per bar.

EXAMPLE 16

A bar of Walnut-Malt flavour was made to the formulation shown below, following the procedures described in Example 9. The bar was enrobed in the coating of Example 7.

| WALNUT-MALT BAR | Weight per mix: | |
|---|---|---|
| Ingredient: | kgs | lbs |
| Protein Blend "A" | 29.54 | 65.13 |
| Walnut pieces | 2.04 | 4.50 |
| Flavours | 1.15 | 0.60 |
| Citric acid | 0.03 | 0.07 |
| Polydextrose 70% | 15.61 | 34.42 |
| Malt syrup (80%) | 14.54 | 32.06 |
| Lecithin | 2.50 | 4.65 |
| Glycerol | 0.45 | 1.00 |
| Water up to | 1.36 | 3.00 |
| TOTAL BATCH WEIGHT: | +/− 68.96 | +/− 152.02 |
| Coating (Example 7) | +/− 12.16 | +/− 26.82 |

CORE WEIGHT: 35.0 g, range 34.5–35.5 g
FINISHED BAR: 41.0 g +/− 3%

The bars contained 14.77 grams of protein and 14.28 grams total carbohydrate, of which 5.58 grams was the poorly digestible carbohydrate, polydextrose. Energy content was calculated at 140 kilocalories per bar.

EXAMPLE 17

A bar of Strawberry-Cheesecake flavour was made to the formulation shown below, following the procedures described in Example 9. The bar was enrobed in the high protein yoghurt-based coating of Example 11.

| CHEESECAKE BAR | Weight per mix: | |
| --- | --- | --- |
| Ingredient: | kgs | lbs |
| Protein Blend "A" | 29.54 | 65.13 |
| Cheddar cheese powder | 1.02 | 2.25 |
| Dried strawberries | 1.02 | 2.25 |
| Flavours | 1.15 | 1.12 |
| Citric acid | 0.03 | 0.07 |
| Polydextrose 70% | 15.61 | 34.42 |
| Honey | 7.65 | 16.87 |
| High fructose syrup | 6.89 | 15.19 |
| Lecithin | 2.50 | 4.65 |
| Glycerol | 0.45 | 1.00 |
| Water up to | 1.36 | 3.00 |
| TOTAL BATCH WEIGHT: | +/− 68.96 | +/− 152.02 |
| Coating (Example 11) | +/− 12.16 | +/− 26.82 |

CORE WEIGHT: 35.0 g, range 34.5–35.5 g
FINISHED BAR: 41.0 g +/− 3%

The bars contained 14.80 grams of protein and 14.30 grams total carbohydrate, of which 5.55 grams was the poorly digestible carbohydrate, polydextrose. Energy content was calculated at 140 kilocalories per bar.

EXAMPLE 18

A low calorie bar of Honey-Peanut flavour, fortified with vitamins and minerals to 20% of the U.S. RDA level, was made to the formulation shown below, following the procedures described in Example 9. The vitamin/mineral mix was used at a level of 0.5 grams per bar; composition of this mix is shown below. The bar was enrobed in the coating of Example 7.

| Honey Peanut BAR. | Weight in | Experimental batch: | |
| --- | --- | --- | --- |
| Ingredient: | kg: | g/85 g | g/bar: |
| Protein Blend "A" | 22.00 | 31.82 | 13.57 |
| Polydextrose, 70% | 28.00 | 40.50 | 17.27 |
| Cellulose | 2.20 | 3.18 | 1.36 |
| Peanut butter | 2.30 | 3.33 | 1.42 |
| Lecithin | 1.90 | 2.75 | 1.17 |
| Vitamin/mineral mix | 0.82 | 1.18 | 0.50 |
| Honey | 0.80 | 1.16 | 0.49 |
| Flavours | 1.08 | 1.56 | 0.67 |
| Glycerine | 0.34 | 0.49 | 0.21 |
| Aspartame | 0.06 | 0.09 | 0.04 |
| Potassium sorbate | 0.06 | 0.09 | 0.04 |
| Citric acid | 0.02 | 0.03 | 0.01 |
| TOTAL BATCH WEIGHT: | 59.26 | | |
| Coating (Example 7) | 10.45 | | |

CORE WEIGHT: 36.75 grams.
FINISHED BAR: 43.14 grams.

The weights of protein and carbohydrate were calculated for the bars; they contained, per bar, 14.00 grams of protein and 12.89 grams total carbohydrate, of which 12.09 grams was the poorly digestible carbohydrate, polydextrose.

Vitamin and mineral content, Example 18.

Except for calcium, phosphorus and magnesium, all vitamins and minerals are 20% of U.S. RDA.

| Vitamin or mineral: | Per bar: | Comments: |
| --- | --- | --- |
| VITAMINS: | | |
| Vitamin A (i.u.) | 1000.00 | |
| Vitamin $D_3$ (i.u.) | 80.00 | |
| Vitamin E (i.u.) | 6.00 | |
| Vitamin C (mg) | 12.00 | Coated |
| Thiamin ($B_1$) (mg) | 0.30 | Coated |
| Riboflavin ($B_2$) (mg) | 0.34 | Coated |
| Niacinamide (mg) | 4.00 | |
| Vitamin $B_6$ (mg) | 0.40 | Coated |
| Vitamin $B_{12}$ (mcg) | 1.20 | Micrograms! |
| Folic acid (mg) | 0.08 | |
| Biotin (mg) | 0.06 | |
| D-pantothenic acid (mg) | 2.00 | |
| MINERALS: | | |
| Calcium (mg) | 50.00 | |
| Phosphorus (mg) | 30.00 | |
| Iron (mg) | 3.60 | |
| Iodine (mg) | 0.03 | |
| Magnesium (mg) | 30.00 | |
| Copper (mg) | 0.40 | |
| Zinc (mg) | 3.00 | |
| Potassium (mg) | 75.00 | |
| Manganese (mg) | 0.40 | |
| Sodium (mg) | 50.00 | |

EXAMPLE 19

A protein bar of fig and raisin flavour, fortified with vitamins and minerals to 100% of the U.S. RDA level, was made to the formulation shown below, following the procedures described in Example 9. The vitamin/mineral mix was used at a level of 2.0 grams per bar; composition of this mix is shown below. The bar was enrobed in the coating of Example 7.

| PROTEIN-RAISIN FORTIFIED BAR | |
| --- | --- |
| Ingredient: | Weight in kg: |
| Protein Blend "A" | 26.00 |
| High fructose syrup | 15.00 |
| Raisin paste | 7.00 |
| Polydextrose 70% | 5.00 |
| Fig paste | 4.00 |
| Vitamin/mineral mix | 2.50 |
| Flavours | 1.50 |
| Peanut butter | 1.25 |
| Crisp rice | 1.25 |
| Lecithin | 1.00 |

CORE WEIGHT: 64.00 grams.
FINISHED BAR: 75.00 grams.

The weights of protein and carbohydrate were calculated for the bars; they contained, per bar, 25.80 grams of protein and 21.50 grams total carbohydrate, of which 3.50 grams was the poorly digestible carbohydrate, polydextrose.

Vitamin and mineral content, Example 19.

Except for calcium, phosphorus and magnesium, all vitamins and minerals are 100% of U.S. RDA.

| Vitamin or mineral: | Per bar: | Comments: |
|---|---|---|
| VITAMINS: | | |
| Vitamin A (i.u.) | 5000.00 | |
| Vitamin $D_3$ (i.u.) | 400.00 | |
| Vitamin E (i.u.) | 30.00 | |
| Vitamin C (mg) | 60.00 | Coated |
| Thiamin ($B_1$) (mg) | 1.50 | Coated |
| Riboflavin ($B_2$) (mg) | 1.70 | Coated |
| Niacinamide (mg) | 20.00 | |
| Vitamin $B_6$ (mg) | 2.00 | Coated |
| Vitamin $B_{12}$ (mg) | 6.00 | Micrograms! |
| Folic acid (mg) | 0.40 | |
| Biotin (mg) | 0.30 | |
| D-pantothenic acid (mg) | 10.00 | |
| MINERALS: | | |
| Calcium (mg) | 250.00+ | |
| Phosphorus (mg) | 150.00+ | |
| Iron (mg) | 18.00 | |
| Iodine (mg) | 0.15 | |
| Magnesium (mg) | 150.00 | |
| Copper (mg) | 2.00 | |
| Zinc (mg) | 15.00 | |
| Potassium (mg) | >375.00 | |
| Manganese (mg) | 2.00 | |
| Sodium (mg) | <250.00 | |

EXAMPLE 20

A blend of 50 parts by weight of a binding protein and 50 parts by weight of a filler protein was prepared in a ribbon blender and labelled "Protein blend E".

The table shows the different combinations used:

| | Binding protein | Filler protein |
|---|---|---|
| 1) | WOODSTONE GOLD* | FARBEST 270* |
| 2) | MIRA PRO 121* | FARBEST 290* |
| 3) | ARDEX-R* | PP-860* |
| 4) | ARDEX D-HD* | WOODSTONE GOLD* |

Dry ingredients corresponding to the combinations given below were placed in the bowl of an ARTOFEX* dough mixer and mixed gently until completely homogenous (5 minutes). Aqueous liquids (high fructose corn syrup, honey, polydextrose, etc..) were then added, mixed in (2 minutes) and followed by the oil and lecithin. After further gentle mixing, flavours were added the whole mixed for a further 2 or 3 minutes, and the resultant mix tested for consistency. When satisfactory, it was extruded through a WERNER-LEHARA* 16" continuous roll extruder equipped with a 1.25"×0.5" die, 8" across. The resultant ribbons were cut with a pneumatic knife to an appropriate length for the indicated weight, and subsequently enrobed in a high protein coating of the composition indicated in Example 7.

HONEY-PEANUT BAR

| | Weight per mix: | |
|---|---|---|
| Ingredients: | kgs | lbs |
| Protein blend E | 30.00 | 66.13 |
| Polydextrose 70% | 16.00 | 35.28 |

HONEY-PEANUT BAR

| | Weight per mix: | |
|---|---|---|
| Ingredients: | kgs | lbs |
| Honey | 7.65 | 16.87 |
| High fructose syrup | 6.89 | 15.19 |
| Soya oil | 2.11 | 4.65 |
| Lecithin | 2.11 | 4.65 |
| Peanut butter | 2.04 | 4.50 |
| Water (up to) | 1.36 | 3.00 |
| Flavours | 0.45 | 1.00 |
| Potassium sorbate | 0.07 | 0.15 |
| Citric acid | 0.03 | 0.07 |
| TOTAL BATCH WEIGHT: | +/−69.86 | +/−154.00 |
| Coating (Example 7) | +/−12.18 | +/−26.85 |

CORE WEIGHT: 35.0 g, range 34.5–35.5 g
FINISHED BAR: 41.0 g +/−3%

The bars contained from 14 to 15 grams of protein and 13 to 13.80 grams total carbohydrate, of which 5.55 grams was the poorly digestible carbohydrate, polydextrose.

EXAMPLE 21

The procedure in example 21 was followed, except that the ratio of binder to filler was changed to 75:25.

| | BINDING PROTEIN | FILLER PROTEIN |
|---|---|---|
| 1) | WOODSTONE GOLD* | Egg albumen |
| 2) | MIRA PRO 121* | REFIT |
| 3) | ARDEX-R* | ARDEX-R 312* |
| 4) | ARDEX D-HD* | PP-860* |

The bars contained from 14 to 15 grams of proteins and 13 to 13.80 grams total carbohydrate, of which 5.55 grams was the poorly digestible carbohydrate, polydextrose.

EXAMPLE 22

The procedure of example 21 was followed except that the protein used consisted of a single protein only:

1) Soy protein ARDEX-R*
2) Pea protein WOODSTONE GOLD*

Bars made with ARDEX-R* contained 14.8 grams of protein and 13.4 grams of carbohydrate, of which about 5.5 grams was the poorly digestible polydextrose. Protein level in bars made with pea protein was about 14.6 grams, reflecting the lower purity of the material.

EXAMPLE 23

The procedure of example 20 was followed, except that the ratio of binder to filler was changed to 25:75.

| | BINDING PROTEIN | FILLER PROTEIN |
|---|---|---|
| 1) | PP-610* | Calcium caseinate denatured by heat treatment |
| 2) | PROFAM S290* | PP-860* |
| 3) | ARDEX-R* | WOODSTONE GOLD* |

Composition of these bars ranged from 14.5 to 15 grams protein, with 14 to 14.5 grams carbohydrate.

What is claimed is:

1. A homogenous low calorie confectionery bar that is sufficiently soft to permit mastication comprising:
   (A) proteinaceous material having a water absorption property of less than 2.5 grams of water per gram of protein at pH 5.5, wherein said proteinaceous material is capable of emulsification;
   (B) carbohydrate material selected from the group consisting of:
   digestible carbohydrate, indigestible carbohydrate, and a mixture thereof, wherein said bar is produced by cold extrusion; wherein said proteinaceous material and said carbohydrate material are both present in said bar in a protein to carbohydrate ratio higher than 1; and wherein said proteinaceous material comprises a filler protein and a binding protein.

2. The confectionery bar of claim 1, wherein said proteinaceous material is selected from the group consisting of:
   (A) binding proteins having a water absorption property of less than 2.5 grams of water per gram of protein at pH 5.5 and wherein said binding proteins are capable of emulsification;
   (B) filler proteins having a water absorption property of less than 2.5 grams of water per gram of protein at pH 5.5 and wherein said binding proteins are capable of emulsification; and
   (C) mixtures thereof.

3. The confectionery bar of claim 1, wherein said binding protein and filler protein are present in a relative ratio of from 100:0 to 0:100 when said filler protein is selected from the group consisting of: caseinates, and soy proteins.

4. The confectionery bar of claim 1, wherein said binding protein and filler protein are present in a relative ratio of from 75:25 to 25:75.

5. The confectionery bar of claim 1, wherein said binding protein and filler protein are present in a relative ratio of from 65:35 to 40:60.

6. The confectionery bar of claim 1, wherein said binding protein is selected from the group consisting of: soy protein isolate, functional whey protein, functional whole milk protein, pea protein, partially denatured egg albumen, and partially devitalized wheat gluten.

7. The confectionery bar of claim 1, wherein said filler protein is selected from the group consisting of: calcium caseinate, soy protein isolate, denatured whey protein, pea protein, devitalized wheat gluten, and denatured egg albumen.

* * * * *